Jan. 15, 1963 — E. J. SCHAEFER — 3,073,635
SHAFT COUPLING
Filed July 17, 1959 — 3 Sheets-Sheet 2
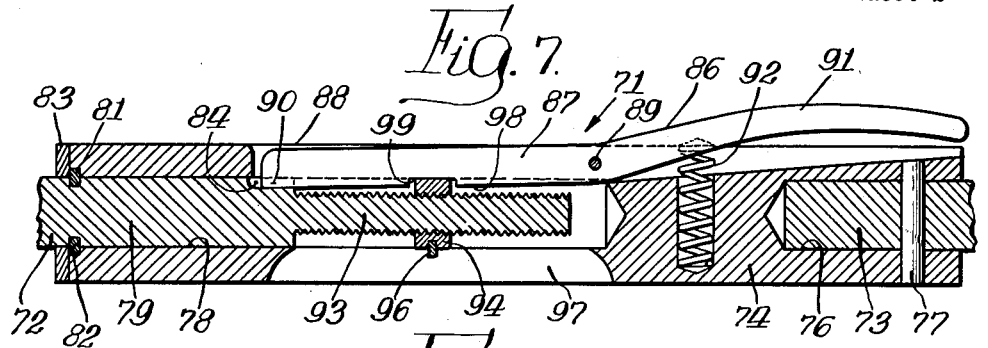
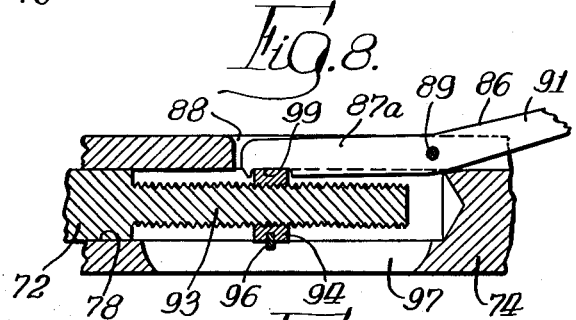
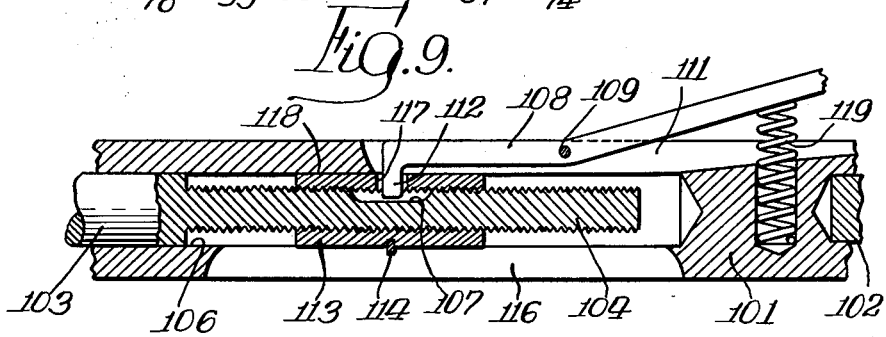
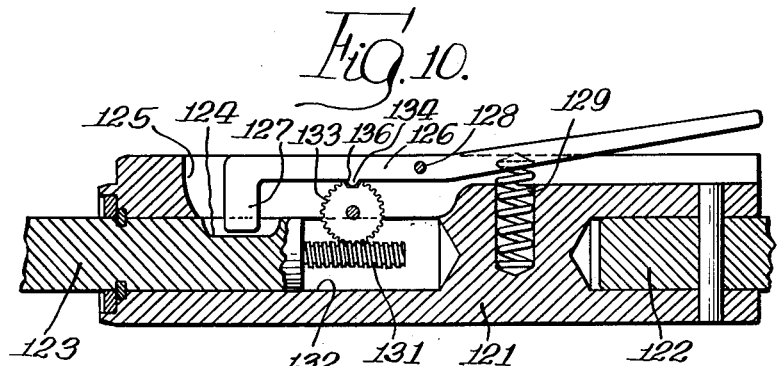
INVENTOR.
Edward J. Schaefer,
BY
Davis, Lindsey, Hibben & Noyes
Attys.

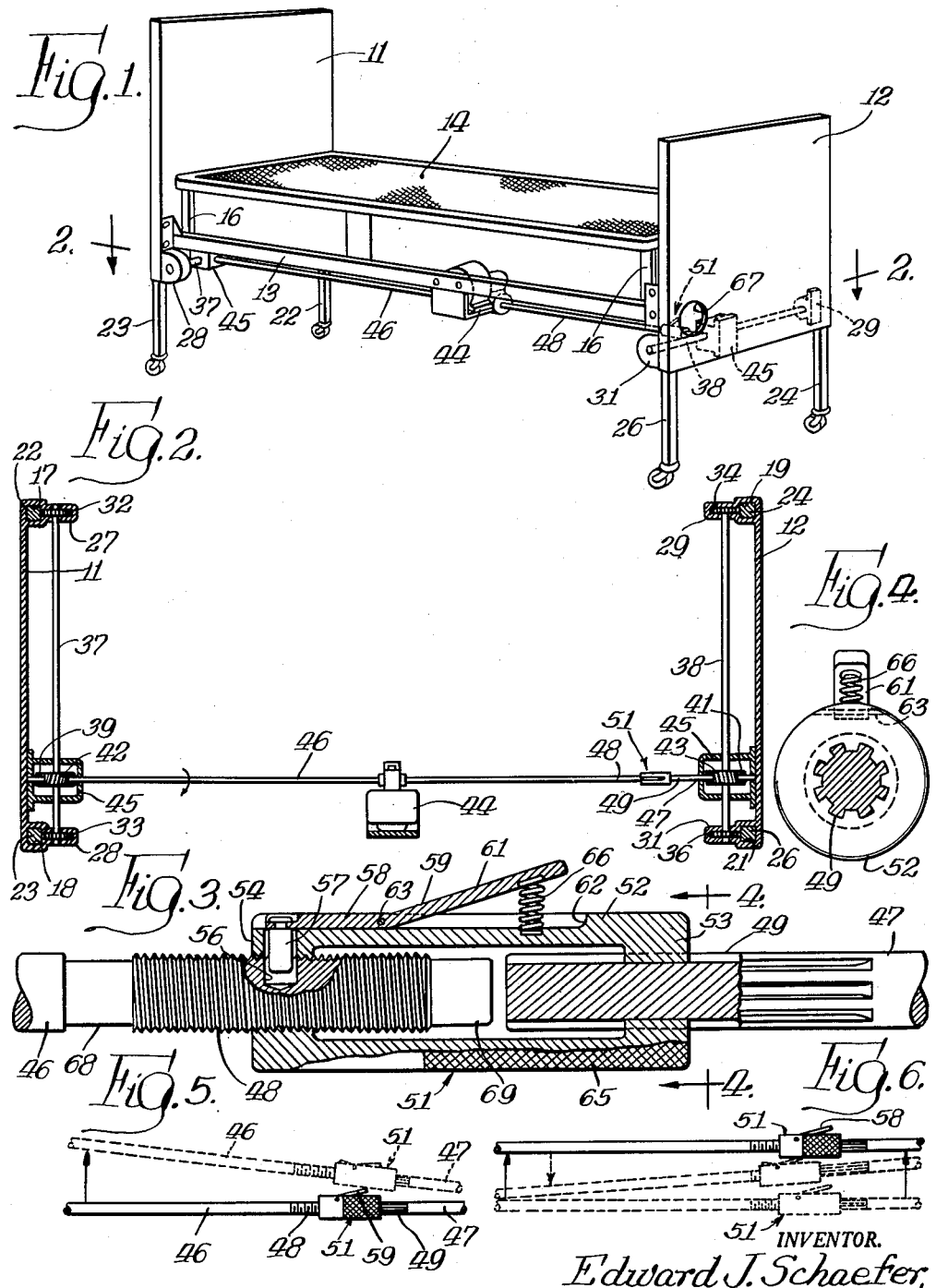

Jan. 15, 1963 E. J. SCHAEFER 3,073,635
SHAFT COUPLING
Filed July 17, 1959 3 Sheets-Sheet 3
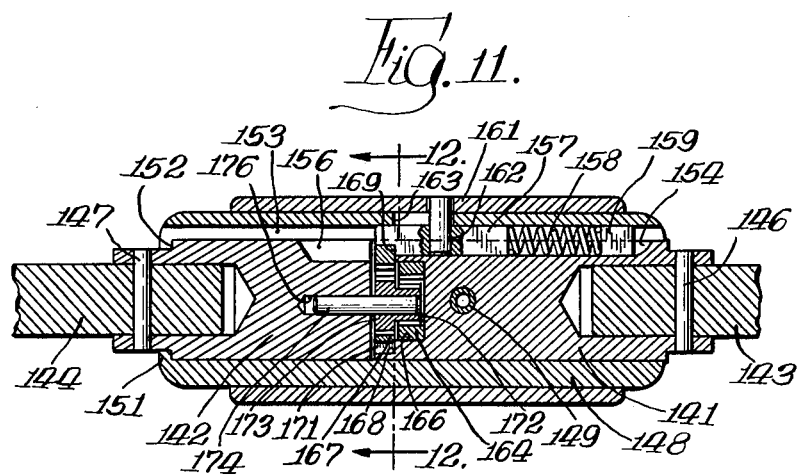
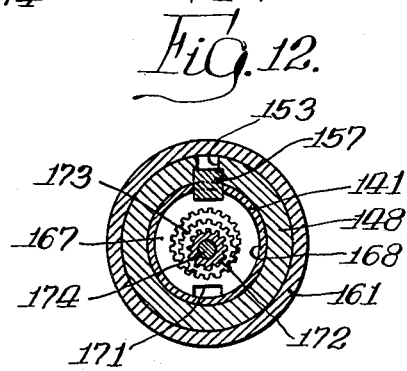
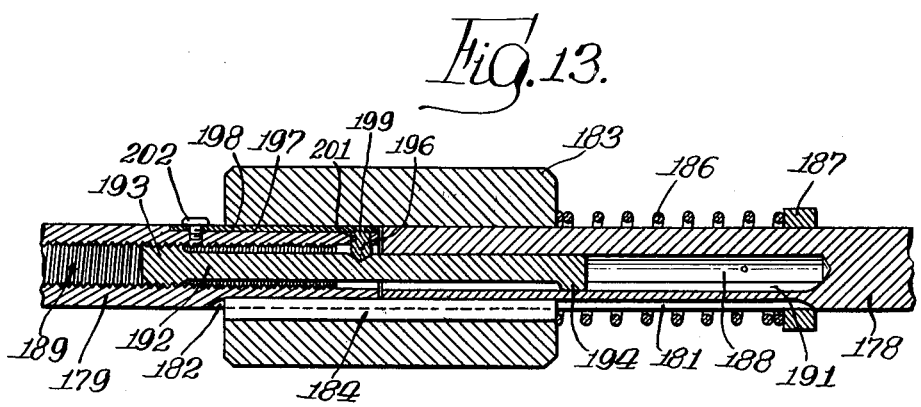
INVENTOR.
Edward J. Schaefer,
BY
Davis, Lindsey, Hibben & Noyes
Attys.

United States Patent Office 3,073,635
Patented Jan. 15, 1963

3,073,635
SHAFT COUPLING
Edward J. Schaefer, % Franklin Electric Co.,
400 E. Spring St., Bluffton, Ind.
Filed July 17, 1959, Ser. No. 827,974
31 Claims. (Cl. 287—108)

This application is a continuation-in-part of my copending application, Serial No. 631,190, filed December 28, 1956 and abandoned July 24, 1959.

This invention relates in general to couplings and in particular to couplings for interconnecting a pair of shafts.

In various devices, synchronized operation of two mechanisms or operation of one of the mechanisms independently of the other is frequently desired. In certain instances, it is required that the two mechanisms be coupled for synchronized operation only when they bear a predetermined relation to each other. An example of such an instance is the case of elevating mechanisms for the head and foot of a hospital bed, where the two mechanisms are driven by a single motor.

It is a primary object of this invention to provide a novel coupling device for a pair of mechanisms, which device permits independent operation of one mechanism and which is engageable to provide synchronized operation of the mechanisms.

Another object is to provide a novel coupling device for a pair of mechanisms, which device is disengageable to provide independent operation of one mechanism but which is also engageable to provide synchronized operation of both mechanisms but only when the mechanisms bear a predetermined relation relative to each other.

Yet another object is to provide a novel coupling device of the foregoing character, which will automatically recouple the mechanisms when the mechanisms bear a predetermined relation relative to each other.

Still another object is to provide a novel coupling device of the foregoing character, which has few parts and is inexpensive to manufacture.

Another object is to provide a novel coupling device of the foregoing character, which will not become jammed as a consequence of mechanical failure to automatically reengage.

Other objects and advantages of the device will become apparent from the subsequent description taken in conjunction with the accompanying drawing wherein:

FIG. 1 is a perspective view of a hospital bed including a coupling embodying the features of the invention, and employed in connection with the elevating mechanisms for the head and foot of the bed;

FIG. 2 is a sectional view of the bed taken along the line 2—2 in FIG. 1;

FIG. 3 is an enlarged longitudinal sectional view of the coupling shown in FIG. 1;

FIG. 4 is a cross-sectional view of the coupling as taken along line 4—4 in FIG. 3;

FIG. 5 is a reduced scale view of the coupling, including its associated shafts and illustrating the relative condition or relation of the major elements thereof during one sequence of operation in conjunction with the hospital bed shown in FIG. 1;

FIG. 6 is a view similar to FIG. 5 showing the relative condition or relation of the same elements during another sequence of operation in conjunction with the hospital bed shown in FIG. 1;

FIGS. 7 to 11 are sectional views similar to FIG. 3 but showing other forms of the coupling;

FIG. 12 is a sectional view taken along line 12—12 in FIG. 11; and

FIG. 13 is a sectional view of still another form of the coupling.

A coupling embodying the features of the invention is adapted to provide a driving connection between a pair of rotary shaft elements which are connected respectively to a pair of mechanisms usually for driving the latter. The coupling includes releasable means which has a connection with one shaft element for rotation therewith and which is shiftable from a released or non-engaging position to a driving position in which the releasable means effects a driving connection between the two shaft elements. To provide synchronized operation of the mechanisms only when they bear a predetermined relation to each other, the coupling also includes movable means associated with both shaft elements and operable in response to relative rotation therebetween to prevent the releasable means from effecting the driving connection when the shafts have rotated relatively to each other away from a predetermined relative position. However, when the shafts are in the predetermined relative position, the movable means permits the releasable means to effect the driving connection. The coupling also preferably includes a coupling member which carries the releasable means, and may serve to keep the shaft elements in axial alignment. Also, the releasable means is preferably spring actuated to automatically effect the driving connection when the shaft elements are in the predetermined relative position.

For convenience of description, the invention is illustrated herein in conjunction with a hospital bed, such as shown in FIGS. 1 and 2, although the coupling embodying the invention may be equally usable in connection with other mechanisms. The hospital bed shown in FIGS. 1 and 2 includes a headboard 11 and a footboard 12 rigidly secured to side rails, one of which is shown at 13, for holding the headboard and footboard in fixed spaced relation to each other. As is customary, the bed is provided with a spring 14 for supporting a mattress, which in this instance is mounted in fixed relation to the headboard 11, the footboard 12 and the side rails, and is supported by a plurality of vertical rigid members 16.

In order that the height and angle of the bed may be adjusted to suit various medical situations, the headboard 11 and the footboard 12 may be selectively or jointly elevated. To this end, the headboard 11 is provided with a pair of vertically extending channels 17 and 18 located on opposite sides of the bed. The footboard 12 is also provided with a pair of like channels 19 and 21. Elongated legs 22, 23, 24 and 26 are telescopically mounted respectively in the channels 17, 18, 19 and 21, in slidable relation therewith so that they may be longitudinally extended and retracted. Each of the legs 22, 23, 24 and 26 is provided with a toothed rack that extends longitudinally along at least a portion of the length thereof. At a level below the spring 14, on the headboard 11 adjacent the legs 22 and 23 and on the footbard 12 adjacent the legs 24 and 26 are rigidly mounted gear housings 27, 28, 29 and 31. The housings 27, 28, 29 and 31 contain pinions 32, 33, 34 and 36 which engage and cooperate with the toothed racks on legs 22, 23, 24 and 26, respectively. The pinions 32 and 33 on the headboard are interconnected by a common shaft 37 and are mounted thereon to rotate in unison therewith for extending and retracting in unison the legs 22 and 23. Likewise, the pinions 34 and 36 on the footboard are interconnected by a common shaft 38 for extending and retracting the legs 24 and 26, the shafts 37 and 38 being journalled in the housings 27, 28, 29 and 31. Thus, it is seen that upon rotation of the shaft 37 in one direction the legs 22 and 23 will be extended from the headboard 11 in unison and on rotation in the opposite direction they will be retracted into the headboard, or in other words, the head of the bed will be appropriately raised or lowered. Likewise, rotation of the shaft 38 in one direction or the other will appropriately raise or lower the foot of the bed.

In the present instance, the rotation of the shafts 37 and 38 is shown as accomplished through worm gear mechanisms, a gear 39 being mounted on the shaft 37 for rotatably driving the same, and another gear 41 being likewise mounted on the shaft 38. A cooperating worm 42 is mounted so that it is in driving engagement with the gear 39 and a similar worm 43 is mounted so that it is in driving engagement with the gear 41, the hand of each worm and gear being such that rotation of the worms in the same direction will cause the same direction of vertical movement at the two ends of the bed. Housings 45 enclose the respective worm gear mechanisms and adjacent portions of the shafts, one being rigidly mounted on the headboard and the other being mounted on the footboard. Power means is provided to effect rotation of the worms 42 and 43, which in the present instance comprises an electric motor 44.

In the present instance, the motor 44 is operable selectively in either direction by appropriate switch means (not shown) and drives the worm 42 by means of an elongated shaft element comprising a shaft 46. The shaft 46 is connected at one end to the worm 42 and extends therefrom generally parallel to the side rail 13. The motor 44 has a driving connection with the shaft 46 intermeditae the worm 42 and an end portion 48 opposite the worm. Upon operation of the motor 44 selectively in either direction, the head of the bed will be appropriately elevated or lowered.

For operating the elevating mechanism at the foot end of the bed, another shaft element comprising a shaft 47 is operatively connected at one end to the worm 43. The shaft 47 extends from the worm 43 toward and substantially in axial alignment with the shaft 46. An end portion 49 of the shaft 47 is positioned adjacent the end portion 48 of the shaft 46 so that they may be conveniently selectively interconnected and disconnected to enable the motor 44 to drive both elevating mechanisms or only the elevating mechanism at the head of the bed. The end portions 48 and 49 of the shafts 46 and 47 are shown interconnected by a coupling device, indicated generally at 51, and embodying the features of the invention.

From the foregoing, it is apparent that, to keep the bed horizontal during the raising and lowering thereof, the two worms 42 and 43 must be in a predetermined relative condition and must be driven in unison. Moreover, to raise or lower the head relative to the foot, it is essential that only the worm 42 be driven. The couplings hereinafter described permit such independent operation of one of the elevating mechanisms and simplify the recoupling of the two elevating mechanisms for synchronized operation when the two are in such predetermined relative condition, that is, when the bed is level. Moreover, the several forms of couplings shown will automatically recouple the mechanisms when the mechanisms are brought to that predetermined relative condition.

FIGS. 3 and 4 show in greater detail the coupling device 51. In this instance, the coupling device 51 has a sleeve or coupling member 52 that extends axially of and interconnects the end portions 48 and 49 of the shafts. A driving connection is provided between the sleeve or coupling member 52 and the shaft 47 at the end portion 49, and in this instance, the end portion 49 is splined, and the sleeve 52 is provided with an inwardly extending collar portion 53 that is likewise splined for cooperation therewith. This splined connection permits relative longitudinal movement between the seleeve 52 and the shaft 47. At its end opposite the collar portion 53, sleeve 52 is provided with another inwardly projecting collar portion 54 that engages the end portion 48 of shaft 46. The collar portion 54 and the end portion 48 are threadedly connected so that rotation of the shaft 46 relative to the sleeve 52 will effect a longitudinal shifting movement of the collar portion 54 relative to the shaft 46 and, hence, of the sleeve relative to both shafts 46 and 47. When the sleeve 52 and the shaft 46 are free to rotate relative to each other, the resistance offered by the elevating mechanism for the foot of the bed holds the sleeve against rotation and the shaft 46 will rotate relative to the sleeve 52.

To provide for synchronized operation of the two shafts 46 and 47, the coupling device 51 includes releasable means for providing a detachable driving connection between the sleeve 52 and the shaft 46. To this end, the shaft or shaft element 46 in this instance is provided with a radially extending detent or pin receiving hole 56 and the sleeve 52 is provided with an inwardly extending releasable detent or pin 57 preferably mounted in the collar portion 54 for engagement with the shaft 46 in the hole 56. The detent 57 is releasable from the hole 56 and, to this end, is rigidly secured at its outer end, as by riveting, to one end 58 of a lever 59. The lever is located in a groove 62 in the sleeve 52 and is bent intermediate its ends to form a lever arm 61 at its opposite end and is pivotally mounted by a pin 63 on the sleeve 52. Thus, the lever 59 is connected to rotate with the shaft element 47. Moreover, by depressing the lever arm 61, the detent 57 is raised out of the hole 56 and the shafts are uncoupled. Thereafter, upon relative rotation between the shafts, reengagement of the detent 57 in the hole 56 is prevented due to misalignment therebetween either angularly or longitudinally or both because of the action of the threaded connection between the sleeve and the shaft, and the detent rides on the surface of the threaded portion 48.

The present form of the device is adapted to provide automatic engagement of the detent 57 in the hole 56 when the shafts are returned to the pretermined relative rotative condition defined by alignment of the detent 57 with the hole 56. In this instance, a compression spring 66 is mounted between the base of the groove 62 and the bottom of the arm 61 to urge the detent 57 radially inwardly relative to the shaft 46. Thus, when the hole 56 and the detent 57 are brought into axial alignment, the detent 57 will automatically engage the shaft 46 and effect the driving connection between the shafts 46 and 47. For reasons of safety, the sleeve 52 is provided with a knurled surface 65 so that upon disengaging the detent 57, the sleeve can be manually turned to insure disengagement, thus avoiding the necessity of holding the lever 59 depressed until after the motor 44 has been started.

To avoid the possibility of jamming, in the event the sleeve 52 is longitudinally moved unduly, the conformation of the shafts 46 and 47, and the coupling member or sleeve 52 are such that the sleeve will become freed from one of the shafts before jamming occurs. For this reason, two pilot portions 68 and 69 are formed on the shaft 46, one at each end of the threads thereon. The pilot portions 68 and 69 are formed to be no larger in diameter than the root diameter of the threads on the shaft and they are at least as wide as the collar portion 54 to provide clearance therefor. Thus, upon undue longitudinal movement of the sleeve 52 in either direction, the collar 54 is freed from the threads on the shaft 46 and will move on to one of the pilot portions so that further longitudinal movement of the sleeve stops. By the use of pilot portions not only is jamming avoided but the shafts and sleeve are maintained in substantial alignment and recoupling of the elements is facilitated.

While the shafts 46 and 47 and the motor 44 may be placed at any convenient location under the spring 14, in the present instance they are shown positioned adjacent the left side of the bed as one faces the bed at the foot end thereof. The coupling device 51 is located adjacent the footboard 12, and an opening 67 may be provided in the footboard 12 to afford easy access to the coupling device 51 for manipulation of the lever 59.

From the foregoing, it is apparent that during operation of the motor 44, when the detent or pin 57 of the coupling device 51 is in engagement with the hole 56, the operation of the two elevating mechanisms is synchronized. Consequently, the bed will remain level and will be raised or lowered, depending on the direction of rotation of the shafts 46 and 47. When it is desired to elevate the head of the bed above the foot, an operator simply brings the bed to a lowered position, disengages the detent 57 from the hole 56 by depressing the lever arm 61 and operates the motor 44 in the proper direction to raise the head until the desired angle of inclination has been reached. This condition is illustrated by broken lines in FIG. 5 which shows that the coupling device 51 has moved to the right from its former position when the bed was horizontal, shown in full lines in FIG. 5. When it is desired to again level the bed, the operator merely operates the motor in the reverse direction, and as rotation proceeds, the coupling device 51 moves to the left to bring the detent 57 into longitudinal and rotative alignment with the hole 56. When such alignment occurs the bed is again level, and the spring 66 automatically urges the detent 57 into engagement with the hole 56.

In order to raise the foot above the head, with the coupling engaged, the bed is raised to its upper position by synchronized rotation of the shafts. As shown in FIG. 6, during the raising of the bed, no longitudinal movement of the coupling device 51 occurs. The detent 57 is then disengaged from the hole and the motor 44 is reversed to lower the head of the bed. This latter action moves the coupling device 51 to the left, as shown by broken lines in FIG. 6. In order to resynchronize the operation of the two elevating mechanisms, the motor 44 is again reversed, thus rotating the shaft 46 to raise the head end of the bed and, again, as soon as the bed is leveled the detent 57 automatically reengages the hole 56 for synchronized operation thereafter. It can be seen that the coupling device 51 may be disengaged with the bed at any particular desirable level, that the head may be then moved relative to the foot selectively up or down, as appropriate, and the whole unit will be resynchronized for operation as soon as the head is returned to the level of the foot.

FIG. 7 shows another form of coupling device, indicated generally at 71, embodying the features of the invention and which interconnects a driving shaft element 72 and a driven shaft element 73. The coupling device 71 has the advantage of being longitudinally fixed with respect to the shaft elements 72 and 73.

The coupling device 71 has a generally cylindrical coupling member 74 connected at its opposite ends to shaft elements 72 and 73, respectively. Thus, one end of the member 74 is provided with a longitudinally extending bore 76 into which the shaft 73 projects, and a pin 77 may extend diametrically through the body 74 and the shaft 73 to provide a driving connection therebetween. The opposite end of the member 74 is also provided with a longitudinally extending bore 78 into which the adjacent end portion 79 of the shaft 72 projects. The member 74 is held against longitudinal movement relative to the shaft 72 by a snap ring 81 mounted in a circumferential groove 82 on the shaft 72 and held against the end of the member 74 by retaining washer 83.

The coupling device 71 also has means releasably engageable with the shaft 72 to provide a driving connection therebetween. In this instance, the end portion 79 of the shaft 72 is provided with a longitudinal extending slot 84. For releasably engaging the end portion 79 in the slot 84 and cooperating therewith an elongated lever 86 is carried in a slot 88 in the body 74. The lever 86 is pivotally mounted at about its midpoint on a transversely extending pivot pin 89 and, thus, will rotate with the shaft 73. One end portion 87 of the lever 86 has an inwardly projecting key 90 located to engage the shaft element 72 in the slot 84, and when thus engaged, the lever 86 effects a driving connection between the coupling device 71 and the shaft 72 and, hence, between the shafts 72 and 73. The opposite end of the lever 86 is formed to provide a handle 91 for raising the key 90 out of the slot 84. A spring 92, mounted in the body 74, bears against the handle 91 to normally urge the end portion 87 in a direction to engage the key portion 90 in the slot 84.

As in the previously described form of coupling, the instant coupling is adapted to provide a driving connection between the shafts 72 and 73 only when the shafts are in a predetermined rotative relation. To this end, the shaft 79 is provided with a reduced diameter elongated threaded extension 93 disposed concentrically in the bore 78 adjacent the slot 88. Mounted on the extension 93 is a threaded nut 94. The nut 94 is prevented from rotating with respect to the member 74 by a keying pin 96 which projects radially from the nut 94 into a longitudinally extending slot 97 in the member 74. Thus, the nut 94 will move in one direction or the other longitudinally of the extension 93 when relative rotation occurs between the shaft 72 and the shaft 73. At most positions along the extension 93, the nut 94 engages a facing surface 98 on the end 87 of the lever and thereby prevents engagement of the key 90 in the slot 84. However, at a predetermined position, in this instance a position substantially midway between the slot 84 and the pin 89, and the end portion 87 is provided with a notch 99 which is slightly wider than the nut 94 and sufficiently deep to receive the nut so as to permit engagement of the key 90 in the slot 84. Thus, the shafts 72 and 73 will be automatically coupled in driving relation only when the nut 94 is positioned at the notch 99 or, in other words, only when the shafts 72 and 73 bear a predetermined rotative relation with respect to each other.

FIG. 8 shows a modified form of the coupling similar in some respects to the coupling shown in FIG. 7, and hence, the same reference numerals will be applied to corresponding parts. This form of coupling differs from the form shown in FIG. 7 in that the shaft 72 has no slot corresponding to the slot 84 and the end portion 87a of the spring pressed lever 86 is considerably shorter than the corresponding end portion 87 in FIG. 7, the end portion 87a terminating just to the left of the notch 99 as shown in FIG. 8. The driving connection between the shaft 72 and the coupling member 74 is effected when the nut 94 jams against one side or the other of the notch 99 in the end portion 87a. When the end portion 87a is raised to disengage the nut 94 and the nut has moved from the position shown in FIG. 8 by relative rotation occurring between the shaft 72 and the member 74, reengagement is prevented until the nut has returned to the position shown in FIG. 8. The construction shown in FIG. 8, thus, avoids the necessity of providing a slot, such as 84 in FIG. 7, and permits the use of the shorter end portion 87a on the lever 86. Therefore, the form of coupling device shown in FIG. 8 may be preferable in installations where a shorter form is preferred and where the load on the shafts will be relatively light.

FIG. 9 shows yet another form of coupling embodying features of the invention. This form of coupling device includes a coupling member 101 having a driving connection (not shown) at one end with a shaft 102 and at its other end telescopes over a shaft 103. The shaft 103 has an elongated threaded extension 104 which extends into a bore 106 in the member 101. Intermediate its ends, the extension 104 is provided with a longitudinally extending slot 107, which in this instance is located approximately midway between the ends of the extension 104. To effect a driving connection between the body 101 and the shaft 103, the coupling is provided with an elongated lever 108 mounted on a centrally located transversely extending pivot pin 109 in a longitudinal slot 111 formed in the member 101. The lever 108 has a radially projecting end portion 112 for engagement in the slot 107 of the shaft 103, thus effecting a driving connection between the member 101 and the shaft 103. To prevent engagement between the end portion 112 and the shaft 103, except when the shafts 102 and 103 are in a predetermined relative rotative position, the extension 104 is provided with an elongated internally threaded element or sleeve 13. The sleeve 113 is held against rotation with respect to the member 101 by a radially extending pin 114 which projects into a longitudinally extending slot 116 in the member 101. Midway between its ends, the sleeve 113 is provided with a hole 117 dimensioned to accommodate the end portion 112 of the lever. From this structure, it will be seen, when the end portion 112 is removed from the slot 107, the sleeve 113 will move one direction or the other upon rotation of the shaft 103 relative to the body 101, the direction depending on the direction of rotation of the shaft 103. Upon such movement the outer surface 118 of the sleeve 113 will prevent engagement of end portion 112 of the lever 108 in the slot 107 when the two shafts are not in their predetermined relative rotative position. A spring 119, bearing against the lever 108, will cause the lever 108 to automatically reconnect the shafts 102 and 103 when the shafts are again returned to their predetermined rotative relation.

FIG. 10 shows a further form of coupling embodying features of the present invention. The FIG. 10 form includes a member 121 having a pinned driving connection at one end with a shaft 122 and is telescoped at its other end over a shaft 123 and is held against longitudinal movement relative thereto. To effect a driving connection between the shafts 122 and 123, the shaft 123 is provided with a slot 124 and the members 121 carries a lever 126, similar to the lever 108 in FIG. 9, formed with a radially projecting end portion 127. The lever 126 is mounted in a slot 125 in the member 121 on a centrally located pivot pin 128, as in the preceding forms, with the end portion 127 located for engagement in the slot 124. The lever 126 is also urged by a spring 129 toward the engaged position.

The FIG. 10 form of coupling uses a worm and worm wheel device for blocking or preventing engagement between the lever 126 and the shaft 123 when the shafts 122 and 123 are not in predetermined rotative relation. In this instance, the shaft 123 is provided with an extension provided with threads forming a worm 131 which projects into a bore 132 in the member 121. A worm wheel 133, carried by the member 121 in the slot 125, is rotatably mounted in driven engagement with the worm 131 and is disposed edgewise between the worm 131 and the lever 126. The lever 126 is provided with a lug 134 located to project radially against the edge of the worm wheel 133, and the edge of the worm wheel 133 is provided with a notch 136 dimensioned to receive the lug 134. From this structure it is seen that, when the end portion 127 of the lever is removed from the slot 124 and relative rotation occurs between the shafts 122 and 123, the worm wheel will be driven in one direction or the other by the worm 131. Such rotation of the worm wheel moves the notch 136 out of alignment with the lug 134 and the surface of the worm wheel acting against the lug 134 will prevent engagement of the end 127 in the slot 124. With this structure, within a range slightly less than one revolution of the worm wheel 133, effected by a plurality of revolutions of one shaft relative to the other, there is only one position of relative rotation between the shafts 122 and 123 where the lug 134 can engage in the notch 136.

FIGS. 11 and 12 show still another form of coupling embodying features of the present invention. In this form of coupling, a gear train is used to block or prevent a driving connection being effected between two shafts when the shafts are not in predetermined relative rotative position. In this instance, a pair of shafts 143 and 144 have a pair of axially aligned body members 141 and 142 connected respectively in driving relation thereto as by pins 146 and 147, respectively. A sleeve member 148 interconnects the body members 141 and 142 and holds them axially aligned. The sleeve member 148 is connected to the body member 141 as by a transversely extending pin 149 to provide a drive connection therebetween so that the sleeve 148 will always rotate with the shaft 143. The sleeve 148 also has an inwardly projecting flange 151 at one end, which coacts with an annular shoulder 152 on the body member 142 to prevent longitudinal movement in one direction between the sleeve 148 and the body 142 and which permits, however, relative rotation therebetween.

To form a releasable driving connection between the shafts 143 and 144, the sleeve 148 is provided with a longitudinally extending slot or keyway 153 which extends the full length of the sleeve 148. Matching slots or keyways 154 and 156 are provided in the body members 141 and 142, respectively. An elongated key 157 is slidably mounted half in the slot 153 and half in the slot 154 as shown. To provide a driving connection between the sleeve 148 and the body 142, the key 157 is longitudinally slidable in the slots 153 and 154 so that it can enter the slot 156 in body member 142, when the slot 156 is aligned with the slot 154, thus effecting a driving connection between shafts 143 and 144. A spring 158, disposed between the key 157 and a block 159 mounted in the outer end of the keyway 154, urges the key 157 toward the engaged position with the body member 142.

For shifting the key 157 to the non-driving position shown in FIG. 11, the coupling is provided with an outer axially slidable sleeve 161. The sleeve 161 is connected to the key 157 by a pin 162 which extends radially through a longitudinally extending slot 163 in the sleeve 148. Thus, the sleeve 161 and the key 157 may be moved longitudinally of the sleeve 148 in unison.

In the instant form of coupling, movement of the key 157 into driving engagement with the body 142 is prevented, when the shafts 143 and 144 are not in their predetermined rotative position, by a gear assembly adapted to block engaging movement of the key 157 with the slot 156. The gear assembly is a reduction gear train of the epicyclic type connected between the ends of the bodies 141 and 142. The gear train comprises a first ring gear 164 mounted in a recess 166 formed in the inner end of the body 141 concentric with the axis of rotation of the coupling. The ring gear 164 is non-rotatable with respect to the body 141 and is provided with internal teeth as shown. A second ring gear 167, slightly larger in diameter than the ring gear 164 and also having internal teeth, is rotatively mounted in a second concentric recess 168 in the body 141 and in face-to-face relation with respect to the ring gear 164. The ring gear 167 has an outer diameter great enough to project into the path of the key 157. In this instance, the ring gear 167 projects about half way across the end of the key, the key having a step 169 formed on its end for blocking engagement with the ring gear 167. The periphery of the ring gear 167 is, however, provided with a notch 171 dimensioned to permit the key 157 to pass therethrough into engagement with the keyway 156 when the gear has been rotated to a position in which the notch 171 is in line with the key 157.

For rotating the ring gear 167 upon relative rotation between the bodies 141 and 142, the body 142 is provided with pinion gear means interconnecting the ring gears 164 and 167. In this instance, a pair of rigidly interconnected or unitary pinions 172 and 173 are rotatably mounted on a stub shaft 174 pressed in an eccentrically located bore 176 in the body 142. The pinions 172 and 173 engage the ring gears 164 and 167, respectively. The pinion 172 has fewer teeth than the pinion 173 and, likewise, the ring gear 164 has fewer teeth than the ring gear 167. Hence, the four gears comprise a gear reduction train of the epicyclic type and upon relative rotation occurring between the shafts 143 and 144, the ring gear 167 will be rotated so that the notch 171 will move with respect to the key 157. When the notch 171 is out of alignment with the key 157 and with the slot 156, the ring gear 167 blocks the key 157 from engaging in the slot and when the notch is aligned with the key 157 and the keyway 156, the spring 158 will push the key through the notch 171 into engagement in the keyway 156. Thus, the shafts 143 and 144 can be coupled together only when the shafts are in one position within a range of a predetermined number of revolutions.

FIG. 13 shows still another form of coupling device embodying the features of the invention. In this form of coupling a pair of shafts 178 and 179 are positioned in end-to-end axially aligned relation and with their adjacent ends spaced a slight distance apart. The shafts 178 and 179 are provided with external longitudinally extending slots or keyways 181 and 182, respectively. A coupling member or sleeve 183 is slidably mounted on the shafts and is provided with a longitudinally extending inwardly projecting rib or key 184 shown in engagement in the keyways 181 and 182 for drivingly connecting the shafts 178 and 179. The keyway 181 is sufficiently long to permit shifting of the key 184 out of the keyway 182 by shifting the sleeve 183 out of engagement with the shaft 179. The sleeve 183 is urged toward the driving position shown in FIG. 13 by a coil spring 186 disposed around the shaft 187 and coacting between the ends of the sleeve 183 and a retaining ring 187 mounted in fixed position on the shaft 178.

The instant form of coupling also includes movable means for preventing the key 184 from effecting a driving connection between the shafts 178 and 179 when the shafts do not bear a predetermined rotative relationship with respect to each other. For this purpose, the shafts 178 and 179 are provided with concentric longitudinally extending bores 188 and 189, respectively. The bore 188 is provided with a longitudinally extending keyway or slot 191 and the bore 189 is threaded. Mounted in the bores 188 and 189 is an elongated element 192 having a threaded end portion 193 in engagement with threads in the bore 189. The opposite end of the element 192 is provided with a lug 194 disposed in the keyway 191 to prevent relative rotation between the element 192 and the shaft 178. Thus, upon relative rotation occurring between the shafts 178 and 179, the element 192 will move one direction or the other longitudinally of the shafts, depending upon the direction of said relative rotation. The element 192 is also provided with a V-shaped notch 196 located at about the midpoint of the element 192.

Mounted in a longitudinally extending recess 197 on the surface of the shaft 179 is an elongated longitudinally extending spring arm 198. One end of the spring arm 198 carries an inwardly projecting pin 199 which is rigidly secured to the spring arm 197 and which projects through a radial hole 201 in the shaft 179 into the bore 189 for engagement with the element 192. The inner end of the pin 199 is V-shaped to fit into the notch 196 when the shafts 178 and 179 bear a predetermined rotative relationship with respect to each other. The opposite end of the spring arm 198 is rigidly secured to the shaft 179 as by a screw 202 and the spring arm 198 presses the pin 199 inwardly against the facing surface of the element 192. The length of the pin 199 is such that when the pin 199 enters the groove 196, the spring arm 198 lies flat in the recess 197 and when the pin 199 is not in the groove, the end of the spring arm projects into the path of the sleeve 183.

From the above-described structure, it can be seen that, when the elements are in the position shown in FIG. 13, the driving position, the shafts 178 and 179 are interconnected by the key 184 for rotation in unison. To disengage the coupling, the sleeve 183 is manually moved to the right to disengage the key 184 from the shaft 179. Upon rotating one of the shafts one or two turns relative to the other, the element 192 moves longitudinally of the shafts and this movement in turn causes the pin 199, because of its V-shape and the corresponding V-shape of the notch 196, to be cammed radially outwardly, carrying the spring arm 198 with it. The spring arm 198 thus forms an abutment which blocks movement of the sleeve 183 to the left and, hence, reengagement of the two shafts, until the shafts have been returned to their predetermined relative rotative position. Recoupling is accomplished automatically when the shafts are returned to their predetermined rotative position, the element 192 automatically returning to the position shown in FIG. 13 by the action of the threads in the bore 189, whereupon the spring arm 198 forces the pin 199 inwardly into the notch 196 and, thus, releases the sleeve 183. The spring 186 then forces the sleeve 183 to the left across the spring arm 198 and the key 184 reengages in the slot 182.

It should be noted that every form of coupling shown permits one shaft to be rotated in either direction with respect to the other shaft within a preestablished range of a plurality of revolutions and permits recoupling when the shafts are in only one predetermined relative position within the range. The range of relative rotation can be made as great as needed by varying the proportions of the part or parts of the structure which move in response to relative rotation. For example, in the form of coupling shown in FIG. 3, the range can be increased by increasing the length of the threaded portion 48 and the length of the sleeve member 52, or by providing a greater number of threads per unit length on the portion 48 and the collar 54. In the form shown in FIGS. 11 and 12, the number of teeth on the gear elements can be varied to change the limits of relative rotation. Other ways, readily apparent to a mechanic, may be provided for varying the limits of the range of relative rotation.

It is thus seen that this invention provides a novel coupling device for a pair of shaft driven mechanisms, which permits independent operation of one of the mechanisms, and yet provides a means whereby the mechanisms may be resynchronized for operation in unison only when they bear a predetermined relation to each other. The device is simple in construction and inexpensive to manufacture. Moreover, the device automatically effects recoupling of the mechanisms, when the mechanisms bear a predetermined relation to each other.

Although the invention has been described in connection with specific structural embodiments, it is to be understood that various modifications and alternative structures may be resorted to without departing from the scope of the invention as defined in the appended claims.

I claim:

1. A coupling device of the character described, comprising a pair of rotatable shaft elements, releasable means connected to one of said elements for rotation therewith and operable for effecting a driving connection with the other of said elements, and movable means operable for preventing said releasable means from effecting said driving connection with said other element, said movable means having connections with both of said elements and thereby being operable in response to relative rotation of said elements away from a predetermined relative position, said releasable means effecting said driving connection with said other element when said elements are in said predetermined relative position.

2. A coupling device of the character described, comprising a pair of rotatable shaft elements, releasable means connected to one of said elements for rotation therewith and operable for effecting a driving connection with the other of said elements, and movable means operable for preventing said releasable means from effecting said driving connection with said other element, said movable means having connections with both of said elements and thereby being operable in response to relative rotation of said elements away from a predetermined relative position within a range of a predetermined plurality of revolutions of relative rotation of said elements, said releasable means effecting said driving connection with said other element only when said elements are in said predetermined relative position within said range.

3. A coupling device of the character described, comprising a pair of rotatable shaft elements, a coupling member having a driving connection with one of said elements, releasable means carried by said coupling member to rotate therewith for effecting a driving connection with the other of said elements thereby connecting the elements in driving relation with each other, and movable means operable for preventing said releasable means from effecting said driving connection, said movable means having connections with both of said elements and thereby being operable in response to relative rotation of said elements away from a predetermined relative position, said releasable means being engageable with said other element when said elements are in said predetermined relative position.

4. A coupling device according to claim 1 in which said other element has a threaded portion and said movable means engages said threaded portion on said other element and is moved thereby when said elements relatively rotate.

5. A coupling device according to claim 4 in which said movable means is threaded and in engagement with said threaded portion on said other element.

6. A coupling device according to claim 1 in which said releasable means comprises a lever extending longitudinally of said elements, said lever being engageable with said other element.

7. A coupling device according to claim 6 in which said other element has a radial opening and said lever has one end provided with a portion projecting radially inwardly for engagement with said other element in said opening.

8. A coupling device according to claim 1, in which said releasable means is spring actuated to effect said driving connection automatically when said elements are in said predetermined relative position.

9. A coupling device according to claim 1 in which said movable means comprises a gear.

10. A coupling device according to claim 3, in which said coupling member encircles the ends of said shaft elements and substantially encloses said movable means.

11. A coupling device according to claim 3, in which said coupling member has a longitudinally extending groove and said releasable means comprises a lever mounted in said groove for engagement with said other shaft element.

12. A coupling device of the character described comprising a pair of rotatable shaft elements, a coupling member having a driving connection with one of said elements, releasable means carried by said member for rotation therewith and engageable with said other element for connecting said elements in driving relation with each other, and movable means operable in response to relative rotation between said elements for preventing said releasable means from engaging said other element upon relative rotation of said elements away from a predetermined relative position within a range of several revolutions and to permit said releasable means to engage said other element only when said elements are in said predetermined relative position within said range.

13. A coupling device of the character described comprising a pair of rotatable shaft elements, a coupling member having a driving connection with one of said elements and associated with said other element, releasable means carried by said member and engageable with said other element to form a driving connection therebetween, and movable means operable in response to relative rotation between said elements to prevent said releasable means from engaging said other element upon relative rotation of said elements away from a predetermined relative position within a range of several revolutions and to permit said releasable means to engage said other element only when said elements are in said predetermined relative position within said range.

14. A coupling device according to claim 1 in which said other element has a longitudinally extending slot and said releasable means is engageable with said other element in said slot to effect said driving connection.

15. A coupling device according to claim 14 in which said releasable means comprises a key movable longitudinally of said shaft elements to engage said other element in said slot, thereby effecting said driving connection.

16. A coupling device according to claim 3 in which said coupling member is held against movement longitudinally of said shaft elements.

17. A coupling device according to claim 1 in which said movable means moves longitudinally of said elements in response to said relative rotation.

18. A coupling device of the character described, comprising a pair of substantially aligned shafts, a coupling member for coupling said shafts, said coupling member having a driving connection with one of said shafts and said coupling member having a threaded connection with the other of said shafts, and releasable means on said coupling member engageable in driving relation with said other shaft in only one position rotatively and longitudinally of said other shaft.

19. A coupling device of the character described, comprising a shaft, a shaft member aligned with said shaft, a coupling member for coupling said shaft and shaft member, said coupling member having a driving connection with said shaft, and said coupling member having a threaded connection with said shaft member, and releasable means mounted on one of said members for effecting a driving engagement with the other of said members only when said members are in a predetermined position rotatively and longitudinally relative to each other.

20. A coupling device of the character described, comprising a pair of substantially aligned shafts, a sleeve member for coupling said shafts, said sleeve member having a splined connection with one of said shafts permitting relative longitudinal movement between said sleeve member and said one shaft, and said sleeve member having a threaded connection with the other of said shafts, and releasable means on said sleeve engageable in driving relation with said other shaft in only one position rotatively and longitudinally of said other shaft.

21. A device according to claim 19 and further characterized in that said other member is provided with a detent receiving hole, and said releasable means comprises a movable detent mounted on said one member for engageable alignment with said hole only when said members are in said predetermined position.

22. A device according to claim 21 and further characterized in that said means also includes a spring for automatically moving said detent into said hole upon said detent and said hole being brought into alignment, and manually operable means for withdrawing said detent from said hole.

23. A device according to claim 21 and further characterized in that said releasable means comprises a manually operable lever mounted on said coupling member, a pin mounted on one end of said lever to engage said hole only when said members are in said predetermined position, and a spring coacting between said sleeve and said lever for automatically moving said pin into engagement with said hole upon said pin and said hole being brought into alignment.

24. A coupling device of the character described, comprising a pair of substantially aligned shafts, a sleeve member for coupling said shafts, said sleeve member having a splined connection with one of said shafts permitting relative longitudinal movement between said sleeve member and said one shaft, said sleeve member and the other of said shafts having cooperable threaded portions and said other shaft having a detent receiving hole, and releasable means for effecting a driving engagement between said sleeve member and said other shaft, said means comprising a movable detent mounted on said sleeve member for alignment with said hole only when said threaded portion of said sleeve is positioned at a predetermined point intermediate the ends of said threaded portion of said other shaft whereby said sleeve member is selectively movable longitudinally in opposite directions relative to said shafts upon disengagement of said detent.

25. A coupling device of the character described, comprising a first shaft having a threaded end portion provided with a radially extending detent receiving hole, reversible drive means operatively connected to said first shaft for selectively driving said shaft in opposite directions, a second shaft substantially aligned with said first shaft and having a splined end portion adjacent said threaded end portion, an elongated sleeve member interconnecting said shafts and having an inwardly extending collar portion at each end thereof, one of said collar portions being threaded and the other being splined to cooperate with the respective threaded and splined end portions, and releasable means for effecting a driving engagement between said sleeve member and said first shaft, comprising a detent mounted on said sleeve member to automatically engage said hole when said threaded collar is positioned at a predetermined point intermediate the ends of said threaded portion, said detent being manually releasable, whereby upon release of said detent said drive means may be operated to effect longitudinal movement of said sleeve selectively in opposite directions relative to said shafts and thus prevent reengagement of said detent.

26. A coupling device of the character described, comprising a pair of substantially aligned shafts, a coupling member for coupling said shafts, each of said shafts having a driving means for driving said member, said driving means on one shaft being splines engaging one end portion of said coupling member and said driving means on the other shaft being threads engaging a portion at the other end of said coupling member and means on said coupling member for securing said coupling member to said other shaft in only one position longitudinally thereof, said means being releasable to effect the longitudinal movement of said member by rotation of said other shaft, the conformation of said shafts and said coupling member being such that, after release of said releasable means said coupling member moves longitudinally relative to said shafts to a point where it is freed from one of said driving means whereby further longitudinal movement of said coupling member is terminated and jamming is avoided.

27. A coupling device according to claim 26, in which said other end portion of the coupling member is movable longitudinally beyond the respective ends of said threads on said other shaft and thus is freed from said threads and further longitudinal movement of said coupling member is terminated.

28. A coupling device according to claim 3 in which said other shaft element has a threaded extension and a longitudinally extending slot, said movable means comprising a nut threaded on said extension and held against rotation relative to said coupling member, and said releasable means comprises a lever having an end portion located to engage said other shaft element in said slot to provide a driving connection between said shafts, said end portion having a notch adapted to receive said nut only when said shaft elements are in said predetermined position.

29. A coupling device according to claim 3 in which said other shaft element has a threaded extension having a radial opening intermediate the ends thereof, said movable means comprises a sleeve threadedly mounted on said extension and held against rotation relative to said coupling member, and said sleeve also has a radial opening, and said releasable means comprises a lever having an end portion located to project through the opening in said sleeve and into the opening in said extension to engage said other shaft element only when said shaft elements are in said predetermined position.

30. A coupling device according to claim 1 in which said other shaft element has an end portion provided with a worm, and said movable means comprises a worm wheel in engagement with said worm to be rotated thereby upon relative rotation between said shaft elements.

31. A coupling device according to claim 1 in which each of said shaft elements has axial bores, one being threaded and the other having a longitudinally extending keyway, and said movable means comprises an elongated element having one end in threaded engagement in the threaded bore and its opposite end being provided with a lug disposed in said keyway to move longitudinally thereof upon relative rotation between said shaft elements.

References Cited in the file of this patent
UNITED STATES PATENTS

| | | |
|---|---|---|
| 810,230 | Swan | Jan. 16, 1906 |
| 1,024,017 | O'Neil et al. | Apr. 23, 1912 |
| 1,954,048 | Jeffrey et al. | Apr. 10, 1934 |
| 2,467,269 | Miller | Apr. 12, 1949 |
| 2,592,166 | McLean et al. | Apr. 8, 1952 |
| 2,680,636 | Griffin | June 8, 1954 |